Figure 1:
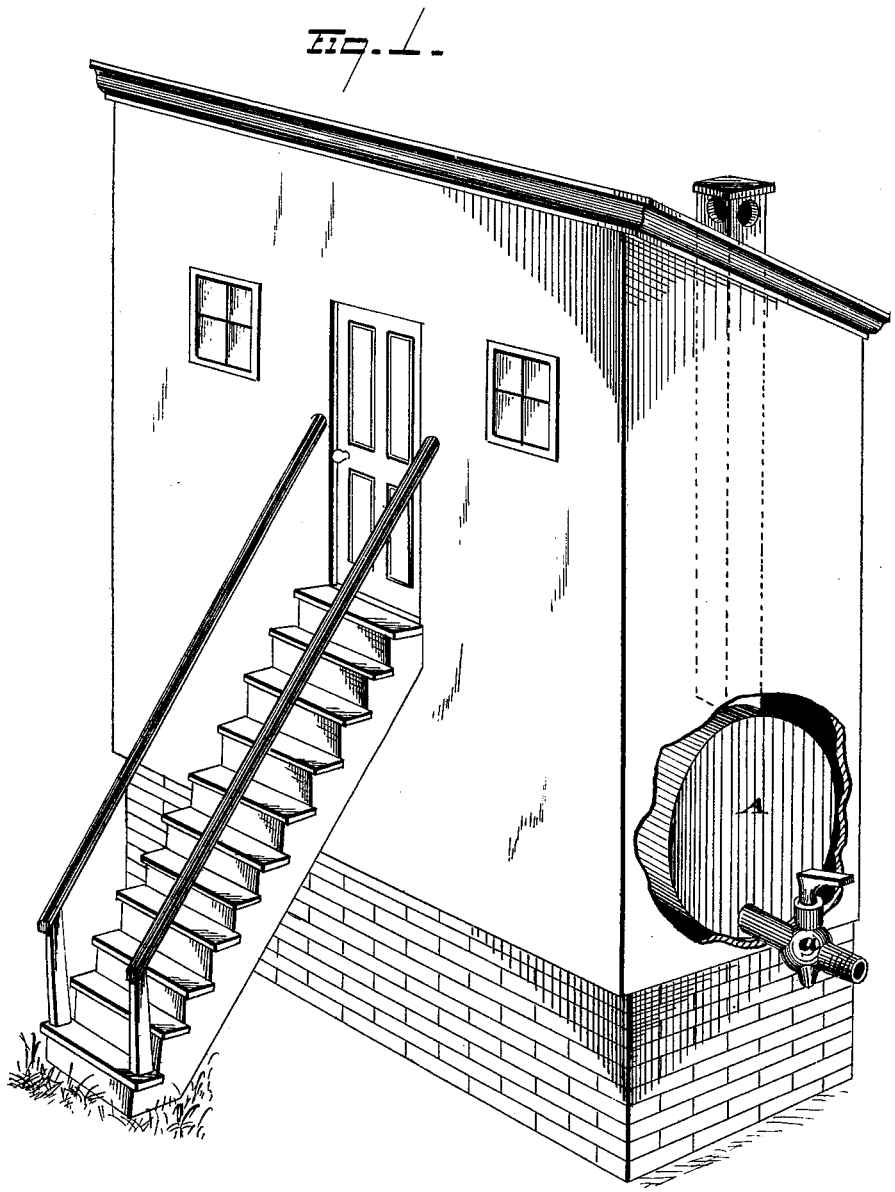

2 Sheets—Sheet 1.

W. GLOVER.
Odorless Closet.

No. 206,874. Patented Aug. 13, 1878.

WITNESSES
Ed. J. Nottingham
A. W. Bright.

INVENTOR
Wilson Glover.
By H. A. Seymour,
ATTORNEY

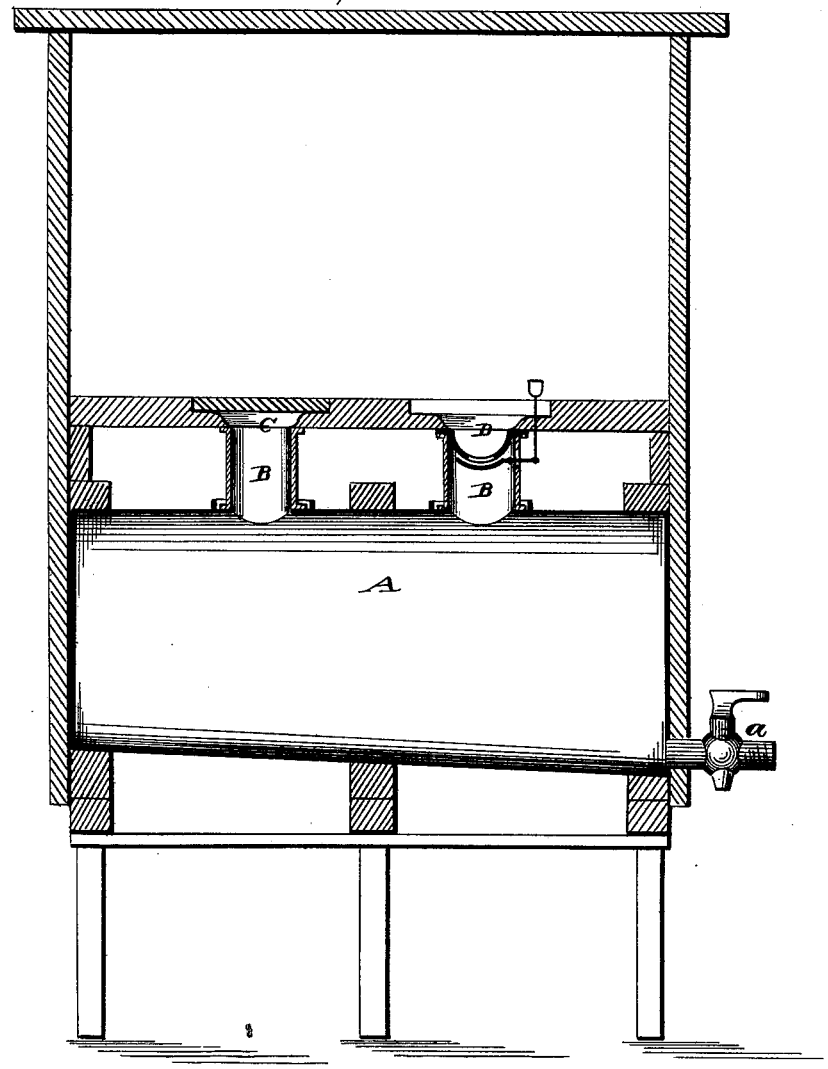

UNITED STATES PATENT OFFICE.

WILSON GLOVER, OF CHARLESTON, SOUTH CAROLINA, ASSIGNOR OF ONE-HALF HIS RIGHT TO JOHN L. SHEPPARD, OF SAME PLACE.

IMPROVEMENT IN ODORLESS CLOSETS.

Specification forming part of Letters Patent No. 206,874, dated August 13, 1878; application filed February 4, 1878.

*To all whom it may concern:*

Be it known that I, WILSON GLOVER, of Charleston, in the county of Charleston and State of South Carolina, have invented certain new and useful Improvements in Odorless Closets; and I do hereby declare the following to be a full, clear, and exact description of the invention, such as will enable others skilled in the art to which it pertains to make and use it, reference being had to the accompanying drawings, which form part of this specification.

My invention relates to certain improvements in odorless closets, and is designed to provide a closet-vault which will prevent the foul air from arising up into the closet and the fluid portion of the deposits from escaping by absorption or otherwise.

The vault is made with a close top having leader-pipe connections, which communicate with the respective seats, said vault and leader pipes being made of material, such as earthenware, metals, paper, &c., rendered non-absorbent by glazing, and connected together by cement, clay, or other suitable means.

In the drawings, Figure 1 is a view representing the vault as supported above the ground. Fig. 2 is a longitudinal section of the same.

The vault A is shown in this instance as being a cylinder with its bottom at an incline, and raised from the surface of the ground. The same may, however, be of other form than cylindrical. It need not be made so its bottom will be inclined, and it need not be supported above the ground.

The above does not constitute any part of my invention, and may be changed, as desired.

The vault is formed with a close top, provided with leader-pipes B, connected therewith by cement, clay, or other means, both the vault and the leader-pipes being made of material, such as earthenware, metal, paper, &c., rendered non-absorbent by glazing.

I show two forms of seat, one, C, of the old ordinary style, which communicates directly with its connecting leader-pipe, and a second form, D, in which a closet-bowl is used intermediately of the two. In the latter instance the water-pan will aid in preventing offensive odors from arising from the deposit-chamber.

If desired, the deposit-chamber may be provided in its rear or at one end with a ventilating apparatus, such as a chimney or similar device, by which a draft or outlet may be obtained for its foul air.

The vault may be cleansed in the manner indicated in the drawings, when it is raised on support from the ground, and a stop-cock, $a$, is fitted in its lower inclined end, whereby its contents may be emptied into carts or other suitable devices for conveying the same away. This does not form a part of my invention, however, as other means may be substituted for the above arrangement. Thus the vault may be placed partially or entirely under ground. Suitable discharge-openings could be made in the top or side of the vault, and suction-pipes connected therewith could exhaust the vault of its contents.

Having fully described my invention, what I claim as new, and desire to secure by Letters Patent, is—

A closet-vault, A, formed of earthenware or similar material rendered non-absorbent by glazing, and having a close top provided with one or more leader-pipe connections, B, made of the same material, substantially as set forth.

In testimony that I claim the foregoing I have hereunto set my hand this 26th day of January, 1878.

WILSON GLOVER.

Witnesses:
R. THURSTON NORTH,
JNO. A. BAILEY.